Aug. 9, 1955
E. L. RICHARDSON
2,714,939
ELECTROSTATIC PRECIPITATORS
Filed April 1, 1953
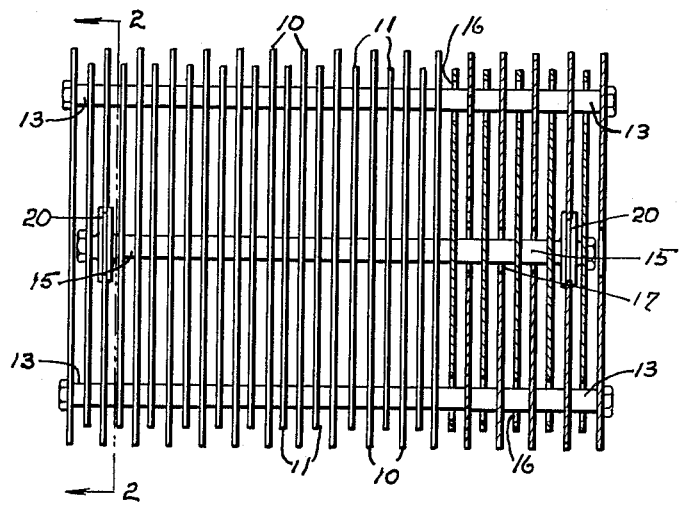
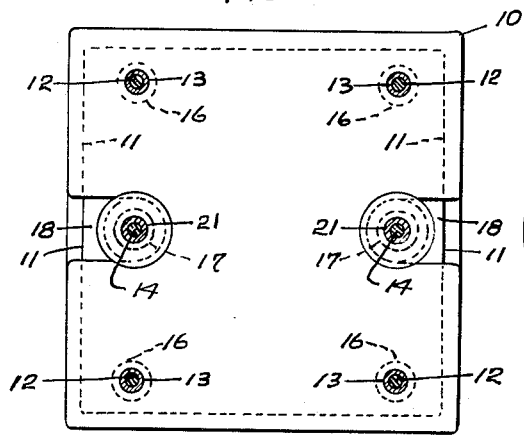
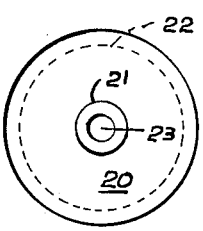
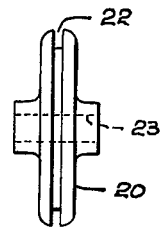
INVENTOR.
EARL L. RICHARDSON
BY Robert T. Palmer
Attorney

United States Patent Office 2,714,939
Patented Aug. 9, 1955

2,714,939

ELECTROSTATIC PRECIPITATORS

Earl L. Richardson, Hyde Park, Mass., assignor to Westinghouse Electric Corporation, East Pittsburgh, Pa., a corporation of Pennsylvania Application April 1, 1953, Serial No. 346,239

3 Claims. (Cl. 183—7)

This invention relates to electrostatic preciptators for removing small foreign particles such as dust, from gases such as air.

In my Patent No. 2,535,696 there is disclosed a collector cell for an electrostatic precipitator which is compact, and which is easily removed from and inserted in an electrostatic precipitator, and which can be stacked in vertical and horizontal rows to provide a collector having any desired capacity. My present invention is an improvement of the collector cell of my patent in that it has fewer parts and a lower manufacturing cost.

In one embodiment of my present invention, two of the ground plates are slotted, and the charge plates are supported from the ground plates by circular insulators which have recessed edge portions which contact the edges of the slots in the slotted ground plates.

Objects of this invention are to simplify the construction and to reduce the manufacturing cost of collector cells for electrostatic precipitators.

This invention will now be described with reference to the drawings, of which:

Fig. 1 is a side elevation, partially in section, of a collector cell embodying this invention;

Fig. 2 is a sectional view along the lines 2—2 of Fig. 1;

Fig. 3 is an enlarged end view of one of the insulators used for supporting the charge plates of the cell, and Fig. 4 is a side view of the insulator of Fig. 3.

The rectangular, metal ground plates 10 which are larger than the rectangular, metal charge plates, are supported on the metal tie rods 12, and are spaced apart by the metal spacers 13 which extend around the tie rods. The charge plates 11 alternate with the ground plates 10, and are supported on the metal tie rods 14. The plates 11 are spaced apart by the metal spacers which extend around the tie rods 14, except that the two adjacent plates 11 at each end of the cell are spaced apart by the insulators 20 around the rods 14.

The tie rods 12 and spacers 13 extend through clearance openings 16 in the plates 11, and the tie rods 14 and the spacers 15 extend through clearance openings 17 in the plates 10.

The insulators 20 are circular and have the circular hubs 21 of reduced diameter, which have the same longitudinal lengths as the spacers 13 and 15 which are similar. The insulators have in their central portions of maximum diameter, the annular grooves 22, and have the central openings 23 through which the tie rods 14 extend.

The second ground plate 10 from each end of the cell, has a slot 18 extending inwardly from each vertical side. Each slot 18 has a semi-circular inner end having a slightly larger diameter than that of the groove 22 in each similar insulator 20, and has a width equal to the diameter of its semi-circular end. The width of each groove 22 is slightly larger than the width of a plate 10.

In assembling a cell, the insulators 20 are slid into the slots 18 of the two ground plates 10 containing such slots, with the inner and side walls of the grooves 22 closely contacting the semi-circular ends of the slots, the latter being so positioned that when the insulators are in position against them, the circular openings 23 in the insulators will be lined-up with the corresponding openings in the spacers 15, and with the tie rods 14.

The cell may be assembled by the usual jig, the only difference over the assembly of the usual cell having tie rods and spacers being that a pair of insulators 20 must be placed in the slots 18 of a pair of plates 10 for replacing the four spacers which ordinarily would be used. With the cell assembled, the charge plates 11 are supported through the insulators 20 from the ground plates 10, and are insulated from the ground plates by the same insulators.

Since the outer portions of the insulators 20 which contact the two slotted plates 10 at the slots 18 therein, have small longitudinal dimensions, they obstruct the gas flow through the cell but little more than the spacers they replace. Also, while some surface of the two slotted plates 10 is removed by the slots, and blocked by the insulators 20, only two ground plates of the seventeen or more used in a typical cell are involved, and such loss in collection surface is more than compensated for by the reduced cost of the cell, since as compared, for example, to the cell of my said patent, the pan shaped end supports with their insulator supporting brackets are eliminated in the present cell.

The collector cell would be operated as usual in electrostatic precipitators for cleaning air, being preferably used downstream of an ionizer, with a D. C. voltage of about 6 kv. being applied between the plates 10 and 11. The electrostatic fields between adjacent plates would cause the dust particles to be deposited upon the plates.

While one embodiment of the invention has been disclosed for the purpose of illustration, it should be understood that the invention is not limited to the exact apparatus and arrangement of apparatus illustrated, since modifications thereof may be suggested by those skilled in the art, without departure from the essence of the invention.

What is claimed is:

1. A collector cell for an electrostatic precipitator comprising a plurality of spaced, substantially parallel collector plates, means including tie rods and spacers around the tie rods for supporting alternate of said plates, the others of said plates having clearance openings through which said tie rods and spacers pass, and means for supporting said other plates from a pair of plates of said alternate plates, said means including slots in said plates of said pair, said slots extending inwardly from opposite sides of said plates of said pair, and insulators in said slots.

2. A collector cell as claimed in claim 1 in which the last mentioned means includes tie rods which pass through said insulators, and spacers around the last mentioned tie rods for supporting said others of said plates from said insulators, said alternate plates having clearance openings through which the last mentioned tie rods and spacers pass.

3. A collector cell as claimed in claim 2 in which the slots have semi-circular inner ends, and in which the insulators have annular grooves contacting said inner ends.

References Cited in the file of this patent

UNITED STATES PATENTS

| | | |
|---|---|---|
| 2,307,603 | Penney | Jan. 5, 1943 |
| 2,470,356 | MacKenzie | May 17, 1949 |